UNITED STATES PATENT OFFICE.

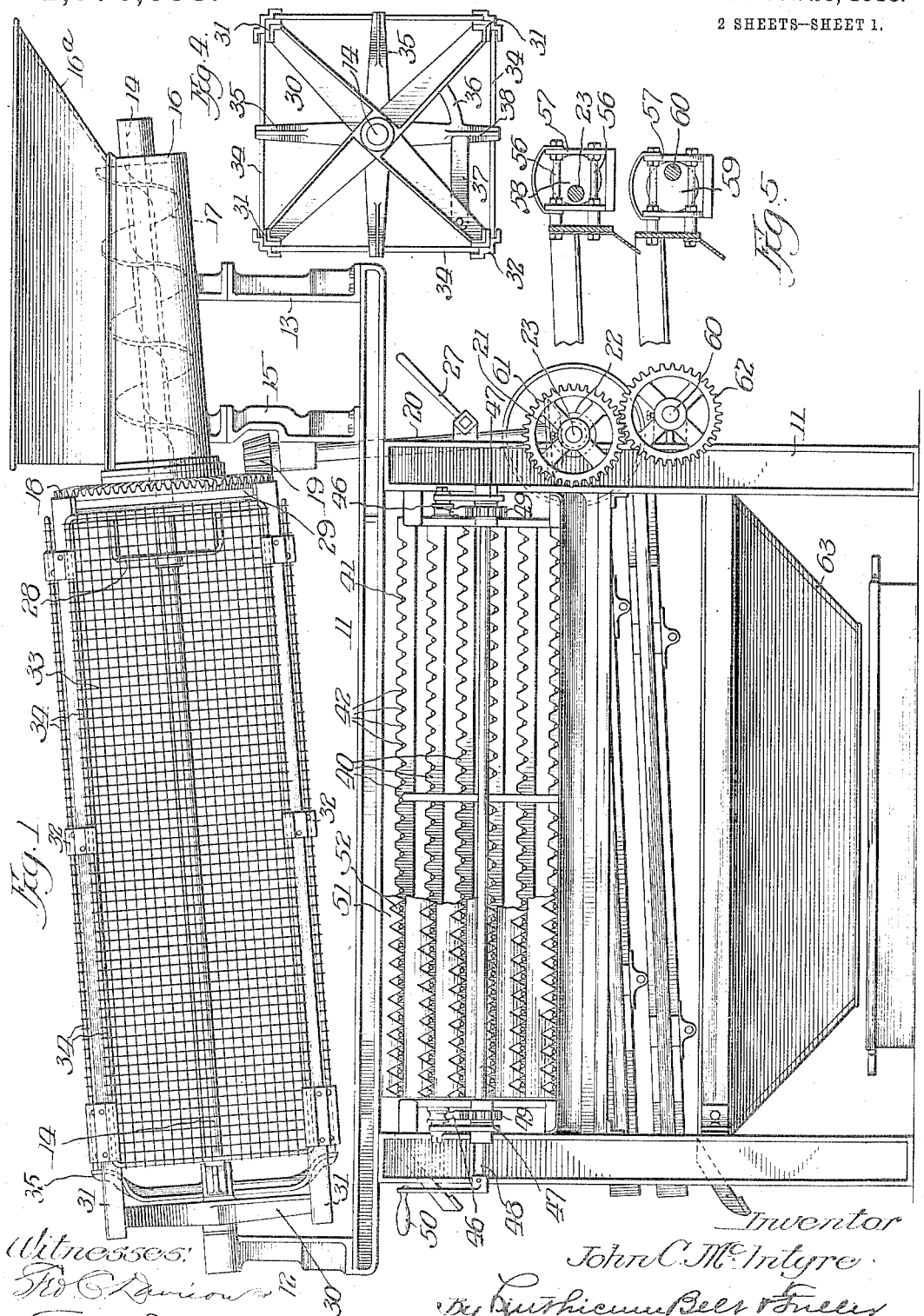

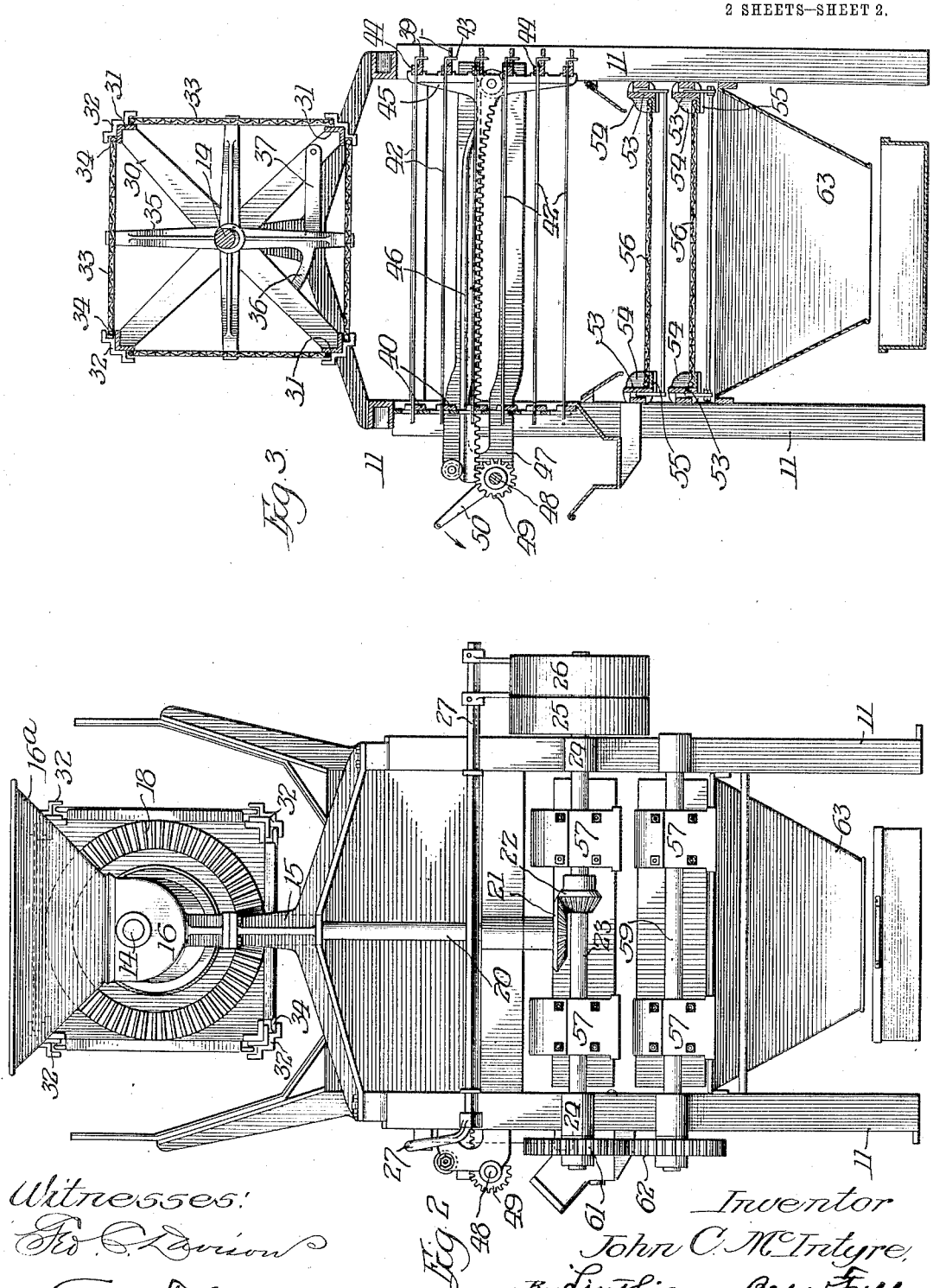

JOHN C. McINTYRE, OF HOOPESTON, ILLINOIS, ASSIGNOR TO SPRAGUE CANNING MACHINERY COMPANY, OF CHICAGO, ILLINOIS, A CORPORATION OF ILLINOIS.

CORN-SILKING MACHINE.

1,076,688.  Specification of Letters Patent.  Patented Oct. 28, 1913.

Application filed March 7, 1913. Serial No. 752,550.

*To all whom it may concern:*

Be it known that I, JOHN C. McINTYRE, a citizen of the United States, residing at Hoopeston, in the county of Vermilion and State of Illinois, have invented certain new and useful Improvements in Corn-Silking Machines, of which the following is a specification.

This invention relates to machines for separating the silk and other debris from the kernels of green corn which have been cut from the cob.

As the corn comes from the machine by which it is cut from the ear in its green condition it is accompanied by a considerable amount of silk which was not removed in the husking operation and there are also small bits of cob and other foreign matter all of which must be separated from the corn before the latter can be prepared for canning or use.

The object of this invention is the provision of a machine for the removal of such foreign matter and particularly the silk, which machine shall have a maximum of efficiency and which can be quickly and thoroughly cleaned without intermitting its own operation or that of the cutting machines which supply the corn thereto.

In order that the invention and the manner of its operation may be readily understood I set forth in the accompanying drawings and in the description based thereon a preferred embodiment of the same, it being understood that the constructional features of the invention are capable of modification within a wide range and the drawing and description are for that reason to be construed in an illustrative sense and not as unnecessarily limiting the invention.

In the drawings: Figure 1 is a side elevation of the machine with certain of the parts broken away; Fig. 2 is a front end elevation; Fig. 3 is a vertical transverse section through Fig. 1 looking toward the rear of the machine; Fig. 4 is a rear end elevation of a portion of the machine; and Fig. 5 is a detail sectional view showing the operating mechanism for the shaking sieves.

The machine frame 11 is shown as provided with standards 12 and 13 upstanding therefrom at the two ends. These standards are of dissimilar height and serve as bearing supports for the two ends of an inclined shaft 14. Supported by the standard 13 and by a supplemental standard 15 is a trough-like member 16 within which operates a screw conveyer 17 rigidly mounted upon the shaft 14 and above and in open communication with the trough 16 is a feed hopper 16ª into which the cut corn is fed by the cutting machines or from any other suitable source of supply.

Upon the shaft 14 is fixed a gear wheel 18 having teeth upon its forward face, which teeth are in mesh with a beveled gear 19 carried by a jack shaft 20 upon the opposite end of which is mounted a miter gear 21 in mesh with a similar gear 22 carried by the drive shaft 23. The drive shaft 23 is suitably journaled in the machine frame at 24, 24 and is equipped with fast and loose pulleys 25, 26, driven from any suitable source of power, a belt shifter 27 being provided for the shifting of the belt from one pulley to the other.

Fixed upon the shaft 14 immediately to the rear of the gear 18 by means of a spider bracket 28 is a square plate 29 having a central aperture coinciding longitudinally with the screw conveyer 17, while at the opposite end of the shaft 14 immediately adjacent its bearing in the standard 12 is a spider 30 having four arms. The corners of the plate 29 and the arms of the spider 30 are connected by channel bars 31 which form a box-like frame of which the plate 29 and the spider 30 constitute end frame members, the former closing the upper end of the structure except for a central feed opening and the latter leaving the lower end of the structure substantially open and unobstructed. Upon each of the angle bars 31 near its two ends and also advantageously in its medial portion are mounted clips 32 the central portions of which are secured to the bars while the terminal portions are spaced from said bars, as clearly shown in Figs. 3 and 4. Upon each of the four sides of this rotary box structure is arranged screens 33, the marginal frame members 34 of which are slidably disposed within the space between the terminal portions of the clips and the angle bars, the upper ends of the screens abutting against the plate 29 and the lower ends thereof terminating near the spider 30 and the lower ends of the angle bars 31.

In order to retain the screens 33 securely in position and at the same time to provide for their ready removal for cleaning purposes a spider 35 is rotatably mounted upon the shaft 14 closely adjacent to the spider 30. The arms of this spider are of less length than the arms of the spider 30 so that when the spider 35 is turned to bring its arms into alinement with the arms of the other spider they will not reach to the angle bars 31 and yet are of sufficient length that when they are turned to a position intermediate the arms of the spider 30 their outer ends will extend to an intersection with the planes of the screens 33. It will thus be seen that in the last mentioned position the screens 33 will rest against the arms of the spider 35 and be retained in position and that when the spider 35 is angularly displaced 45° its arms will be removed from in front of the screens 33 and the latter can be easily slipped from under the clips 34 and removed from the frame.

For the purpose of locking the spider 35 in retaining position I form upon one arm thereof a stop projection 36, the outer end of which abuts against the edge of one of the arms of the spider 30 when in retaining position while a spring catch 37 is mounted upon one of the arms of the spider 30 in such position that its free end will snap into position behind a rib 38 on the spider 35 thus releasably locking the spider 35 in position with its arms engaging the ends of the screens to prevent their displacement.

The frame carried by the shaft 14 and the screens removably mounted upon the four sides of the frame constitute a trommel or tumbling screen which receives from the hopper 16ª by means of the screw 17 the cut corn and any bits of silk, cob and other debris coming from the cutting machine. The trommel being constantly rotated, the material is tumbled from one screen to the other and the grains of corn fall through the meshes of the screen while most of the silk, cob and other refuse matter are either held in the meshes of the screens or finally discharged at the lower open end of the trommel.

Immediately below the trommel and connecting the end members of the machine frame are a plurality of supporting rails extending in parallel vertical spaced relation longitudinally upon the two sides of the frame, the supporting rails 39 at the rear of the machine are advantageously provided at spaced intervals with vertical apertures while the supporting rails 40 at the front of the machine are provided in their upper edges with notches 41. A plurality of series of silk collecting wires 42 have their rear ends angularly bent at 43 and entered within the apertures of the supporting rails 39, the said wires extending across the machine frame beneath the trommel and having their front ends resting loosely within the notches 41 of the rails 40. The collecting wires 42 extend parallel to each other and the wires of the various horizontal series are advantageously arranged in vertical staggered relation.

A plurality of stripper bars 44 are provided one for each horizontal series of collecting wires. These stripper bars extend longitudinally of the machine and are provided with transverse horizontal apertures in which the collecting wires are threaded so that the stripper bar may slide upon the wires. The stripper bars are connected with each other at their two ends by cross heads 45, each of which is formed integral with or fixedly attached to a rack bar 46. The rack on the lower edge of the rack bar extends in a substantially horizontal direction except at a point close to the cross head where it is sharply deflected or offset.

Suitably journaled in the brackets 47 is a shaft 48 carrying a pair of pinions 49, 49, and provided with an operating handle 50. The pinions 49 are in gear with the rack bar 46 and it will be readily understood that as the shaft is rotated in the direction indicated by the arrow in Fig. 3, the racks 46 and the cross heads 45 will be moved to the left toward the front of the machine and the stripper bars 44 will be caused to slide along the wires 42 stripping from the wires the bits of silk caught thereby as the grains of corn fall from the trommel through the wires. The accumulated bits of silk will be thus pushed to the front of the machine by the stripper bars and when the offset portion of the rack bars reach the pinions 49 the cross heads and stripper bars together with the wires will be lifted so that the stripper bars will clear the upper edge of the notched rails 40 and push the silk off the outer ends of the wires.

As the offset portion of the rack rides upon the pinion the ends of the wires 42 being lifted out of the notches 41 are deprived of the lateral support of the notched walls. In order to guard against their lateral displacement and to insure them dropping again into the notches 41 when the stripper bars recede, I mount above and in front of each of the supporting rails 40 a guard strip 51 provided in its lower edge with downwardly opening notches 52 coinciding with the upwardly opening notches 41 of the rail. The guard strips being hingedly suspended along their upper edges so as to swing, rest by gravity in contact with the outer faces of the rails 40. It will thus be seen that the ends of the wires 42 are confined within a diamond shape opening formed by the walls defining the lower and upper notches and that when the stripper bars lift the ends of the wires out of the lower notches they enter the narrowing portion of the upper notches and when the advancing stripper bars strike against the hinged guard strips 51 said strips swing outwardly to permit the accumulation of silk to be discharged from the ends of the wires while confining the wires themselves against lateral displacement.

Below the series of silk collecting wires are arranged a pair of shaking sieves comprising each a frame formed of angle bars 53 having closed ends 54 and supported for reciprocation upon guides 55, a screen 56 being removably mounted upon the angle bars 53 as a frame. These sieves are arranged at a slight inclination and upon their upper front ends each has rigidly secured thereto by means of the bolts 56ª, 56ª a housing 57. Within and in frictional contact with the side walls of the housing 57 carried by the upper sieve rotate a pair of cams 58 mounted upon the main or drive shaft 23, and within and in frictional contact with the side walls of the housing 57 carried by the lower sieve is a pair of similar cams 59 mounted upon a counter shaft 60 which is driven from the main shaft 23 by means of a pair of intermeshing gears 61 and 62. The two sets of cams 58 and 59 may be advantageously displaced 180° although such displacement is not necessary to successful operation. By the superposed shaking sieves the grains of corn, falling through the wires 42 and practically rid of foreign matter, are subjected to a final treatment so that any bits of silk, cob or the like still remaining are caught while the grains of corn fall through the sieve into the discharge hopper 63. The screens 56 of the shaking sieves can be lifted out of the frames and quickly cleansed.

At frequent intervals during the operation of the machine the handle 50 will be actuated to strip the accumulated silk from the wires 42 and at longer intervals, whenever necessary, the belt shifter 27 may be operated to stop the machine permitting the corn to accumulate within the trough 16 while the spider 35 is turned at an angle and the screens 33 slipped out of the trommel and cleansed by dipping in water or substituted by another set of screens held in reserve. The screens 56 of the sieves may be cleansed at the same time or substituted by others in the same manner whereupon the screens having been replaced the machine can be again started and the corn which has accumulated within the trough allowed to continue its course through the machine. It will thus be seen that by reason of the provision of means whereby the machine may be in all of its parts quickly and thoroughly cleansed the operation is practically continuous and it is not necessary to stop the operation of the cutting machines while the silking machine is itself cleansed.

I claim:

1. In a machine of the class described, the combination of a frame having a supporting rail, a series of collecting wires resting on the rail, a stripper bar mounted for movement longitudinally of and in contact with the wires, means to move the bar along the wires and to lift the latter off the rail, and means to prevent lateral displacement of the wires while elevated, substantially as described.

2. In a machine of the class described, the combination of a frame having a supporting rail, a series of collecting wires hingedly mounted at one end and having their free ends resting on the rail, a stripper bar slidably mounted on the series of wires, means to move the bar along the wires and to lift the latter off the rail to permit the bar to pass the rail, and means to prevent lateral displacement of the wires while elevated, substantially as described.

3. In a machine of the class described, the combination of a frame having a supporting rail, a guard strip provided in its lower edges with notches adjacent the upper edge of the rail, a series of collecting wires having their ends resting on the rail within the notches of the guard strip, a stripper bar slidably mounted on the series of wires, and means to move the bar along the wires and to lift the latter off the rail within the notches of the guard strip to permit the bar to pass the rail without lateral displacement of the wires, substantially as described.

4. In a machine of the class described, the combination of a frame having a supporting rail with notches in its upper edge, a guard strip provided in its lower edges with notches coinciding with the notches of the rail, a series of collecting wires hingedly mounted at one end and having their free ends resting on the rail within the notches of the rail and strip, a stripper bar slidably mounted on the series of wires, and means to move the bar on the wires and to lift the latter out of the rail notches to permit the bar to pass the rail, the notches of the guard strip serving to prevent lateral displacement of the elevated wires, substantially as described.

5. In a machine of the class described, the combination of a frame having supporting rails along its two edges, one of the rails provided with notches in its upper edge, a guard strip pivoted to swing above the notched rail and provided in its lower edges with notches coinciding with the notches of the rail, a series of collecting wires hingedly connected at one end with the second rail and having their free ends resting within the notches of the first rail, and confined within the notches of the strip, a stripper bar slidably mounted on the series of wires, means to move the bar along the wires and to lift the latter out of the rail notches to permit the bar to pass the rail, the guard strip swinging on its hinges to permit the passage of the bar above the rail while guarding the wires against lateral displacement, substantially as described.

6. In a machine of the class described, the combination of a frame having supporting rails along its two edges, one of the rails provided with notches in its upper edge, a guard strip pivoted to swing above the notched rail and provided in its lower edges with notches coinciding with the notches of the rail, a series of collecting wires hingedly connected at one end with a second rail and having their free ends resting within the notches of the first rail, and confined within the notches of the strip, a stripper bar slidably mounted on the series of wires, a rack connected to the stripper bar and having an offset portion, a pinion in engagement with the rack, and means to rotate the pinion whereby to move the bar along the wires and to lift the latter out of the rail notches to permit the bar to pass the rail, the guard strip swinging on its hinges to permit the passage of the bar above the rail while guarding the wires against lateral displacement, substantially as described.

7. In a machine of the class described, the combination of a frame, having a plurality of supporting rails along each side thereof, the rails on one side provided with notches in their upper edges, a guard strip pivoted to swing above each of the notched rails and provided in its lower edge with notches coinciding with the notches of the rail, a plurality of series of collecting wires having one end resting within the notches of the rails and guard strips and extending across the frame with their other ends hingedly connected to the supporting rails upon the opposite side, a plurality of stripper bars having apertures through which pass the several collecting wires, a cross head connecting the several bars, means to move the cross head and with it the stripper bars in unison along the wires and to lift the latter out of the rail notches to permit the bars to pass the rails, the guard strips swinging upon their pivots to permit the bars to clear the rails while preventing lateral displacement of the wires, substantially as described.

8. In a machine of the class described, the combination of a frame having a plurality of supporting rails along each side thereof, the rails on one side provided with notches in their upper edges, a guard strip pivoted to swing above each of the notched rails and provided in its lower edge with notches coinciding with the notches of the rail, a plurality of series of collecting wires having one end resting within the notches of the rails and guard strips and extending across the frame with their other ends hingedly connected to the supporting rails upon the opposite side, a plurality of stripper bars having apertures through which pass the several collecting wires, a cross head connecting the several bars, a rack connected to the cross head and having an offset near the head, a pinion in mesh with the rack, means to rotate the pinion whereby to move the rack and cross head with the bars along the rods toward the notched rails, the offset of the rack imparting a final lifting action to the head whereby to elevate the bars and wires clear of the rail so as to discharge the accumulation from the wires, the notched guard strips swinging on their pivots to permit the stripper bars to clear the rail while confining the elevated wires against lateral displacement, substantially as described.

JOHN C. McINTYRE.

Witnesses:
CECIL YOUNG,
I. E. MERRITT.